US011026372B2

(12) United States Patent
De Groot et al.

(10) Patent No.: US 11,026,372 B2
(45) Date of Patent: Jun. 8, 2021

(54) PLANT GROWTH SYSTEM

(71) Applicant: Rockwool International A/S, Hedehusene (DK)

(72) Inventors: Jacob Frank De Groot, Roermond (NL); Dolf van der Veen, Sittard (NL); Eelke Gjalt Hempenius, Deest (NL)

(73) Assignee: ROCKWOOL INTERNATIONAL A/S, Hedehusene (DK)

(*) Notice: Subject to any disclaimer, the term of this patent is extended or adjusted under 35 U.S.C. 154(b) by 354 days.

(21) Appl. No.: 14/902,909

(22) PCT Filed: Jul. 4, 2014

(86) PCT No.: PCT/EP2014/064319
§ 371 (c)(1),
(2) Date: Jan. 5, 2016

(87) PCT Pub. No.: WO2015/001083
PCT Pub. Date: Jan. 8, 2015

(65) Prior Publication Data
US 2016/0143228 A1 May 26, 2016

(51) Int. Cl.
*A01G 9/24* (2006.01)
*A01B 79/00* (2006.01)
(Continued)

(52) U.S. Cl.
CPC ............ *A01G 9/124* (2013.01); *A01B 79/005* (2013.01); *A01G 25/16* (2013.01); *A01G 31/02* (2013.01);
(Continued)

(58) Field of Classification Search
CPC ........ A01G 25/16; A01G 22/00; A01G 31/02; A01G 9/24; A01G 25/167; G06Q 10/06;
(Continued)

(56) References Cited

U.S. PATENT DOCUMENTS 4,015,366 A 4/1977 Hall, III
5,184,420 A * 2/1993 Papadopoulos ........ A01G 31/00
47/62 N
(Continued)

FOREIGN PATENT DOCUMENTS

CN 201226706 Y 4/2009
CN 101872440 A 10/2010
(Continued)

OTHER PUBLICATIONS

Australian Examination Report dated Jan. 4, 2017 for corresponding AU Application No. 2014286114.
(Continued)

*Primary Examiner* — Darrin D Dunn
(74) *Attorney, Agent, or Firm* — Tarolli, Sundheim, Covell & Tummino LLP

(57) ABSTRACT

A system and related method for monitoring plant growth conditions is provided, comprising a plurality of detectors (7) and central detector data processing means (1103); each detector (7) being arranged to measure properties indicative of a temperature, a water content, and a nutrient content, of a plant growth substrate; each detector (7) being further arranged to transmit the measured property or properties over a communications link to the central detector data processing means (1103); the central detector data processing means (1103) being arranged to store predefined irrigation data, defining a relationship between plural values for temperature, water content, pH level and/or nutrient content of the plant growth substrate; and plural desired irrigation output values; process the measured properties from each detector (7) to determine calculated properties of the substrate; and provide an output indicative of a desired irrigation input for the growth substrate, based upon measured properties received from the detectors (7) and the predefined irrigation data. A portable detector communications device (Continued)

(1105) for communicating configuration data relating to the detectors (7) may be included in the system.

16 Claims, 8 Drawing Sheets

(51) Int. Cl.
| | |
|---|---|
| *A01G 25/16* | (2006.01) |
| *G05B 15/02* | (2006.01) |
| *A01G 31/02* | (2006.01) |
| *A01G 9/12* | (2006.01) |
| *A01G 24/18* | (2018.01) |

(52) U.S. Cl.
CPC .............. *G05B 15/02* (2013.01); *A01G 24/18* (2018.02); *Y02P 60/12* (2015.11); *Y02P 60/21* (2015.11)

(58) Field of Classification Search
CPC ............... G01N 33/0098; G01N 27/04; G01N 2021/8466; G01N 21/6408; G05B 2219/2625; G05B 19/042; G05B 15/02; G05B 2219/23005; A01B 79/005; H04L 67/125; Y02A 40/254; Y02A 40/238; Y02A 40/264; A63F 13/217; A63F 13/235; A63F 2009/2442; A63F 2009/2489; G06T 2207/30188
See application file for complete search history.

(56) References Cited

U.S. PATENT DOCUMENTS

| | | | | |
|---|---|---|---|---|
| 5,598,663 A * | 2/1997 | Kikuchi | ................ | A01G 31/00 47/62 N |
| 5,927,603 A | 7/1999 | McNabb | | |
| 6,065,245 A * | 5/2000 | Seawright | .............. | A01G 31/00 47/62 R |
| 6,295,759 B1 * | 10/2001 | Malone | .................. | A01G 31/00 47/62 E |
| 6,508,033 B2 * | 1/2003 | Hessel | .................. | A01B 79/005 47/60 |
| 6,892,113 B1 | 5/2005 | Addink et al. | | |
| 7,526,539 B1 * | 4/2009 | Hsu | .................... | H04L 12/2818 709/203 |
| 7,836,072 B2 * | 11/2010 | Yoneda | ................. | G06Q 10/06 600/310 |
| 8,001,721 B2 * | 8/2011 | Okamoto | .............. | A01G 31/02 47/21.1 |
| 8,011,852 B2 * | 9/2011 | Gesser | ................. | A01C 23/042 405/43 |
| 8,145,330 B2 * | 3/2012 | Emoto | ................... | G06Q 10/06 47/17 |
| 8,340,910 B1 * | 12/2012 | Magro | ..................... | A01G 7/00 702/2 |
| 8,849,461 B2 * | 9/2014 | Ersavas | ................ | A01G 25/167 700/275 |
| 9,073,798 B1 * | 7/2015 | Brooke | ................... | C05D 9/02 |
| 9,220,206 B2 * | 12/2015 | Walliser | ................ | A01G 31/02 |
| 9,247,688 B1 * | 2/2016 | Gurin | ....................... | A01C 1/06 |
| 9,392,753 B2 * | 7/2016 | Krijn | ....................... | A01G 7/045 |
| 9,714,741 B2 * | 7/2017 | Sandidge | .................. | F17D 3/01 |
| 9,880,537 B2 * | 1/2018 | Mewes | ................ | G05B 19/042 |
| 10,352,319 B2 * | 7/2019 | Hernandez Martinez | .................... | F04B 13/00 |
| 2002/0014539 A1 * | 2/2002 | Pagano | ................. | A01G 25/167 239/1 |
| 2002/0088173 A1 * | 7/2002 | Hessel | ................. | A01B 79/005 47/60 |
| 2002/0167587 A1 * | 11/2002 | Ogasawara | ............ | H04N 7/183 348/89 |
| 2003/0024155 A1 | 2/2003 | Kuroda et al. | | |
| 2005/0159911 A1 * | 7/2005 | Funk | .................... | G05B 19/418 702/104 |
| 2006/0001540 A1 * | 1/2006 | Staples | ................. | A01G 25/167 340/539.26 |
| 2006/0122794 A1 * | 6/2006 | Sprague | .................. | G06Q 10/06 702/32 |
| 2006/0254138 A1 * | 11/2006 | Bissonnette | ........... | A01G 31/00 47/60 |
| 2006/0292012 A1 * | 12/2006 | Brudevold | ............ | A47J 31/402 417/53 |
| 2007/0009365 A1 * | 1/2007 | Litterst | .................. | B67D 1/102 417/44.1 |
| 2007/0082600 A1 | 4/2007 | Asvestas et al. | | |
| 2007/0173981 A1 * | 7/2007 | Vidovich | .............. | A01G 25/167 700/284 |
| 2007/0289207 A1 * | 12/2007 | May | ........................ | A01G 7/00 47/17 |
| 2008/0120335 A1 * | 5/2008 | Dolgoff | .................. | G05B 15/02 |
| 2009/0031622 A1 * | 2/2009 | Emoto | ..................... | A01G 7/00 47/17 |
| 2009/0105886 A1 * | 4/2009 | Skinner | .................. | A01G 17/02 700/284 |
| 2009/0223128 A1 * | 9/2009 | Kuschak | ............... | A01G 31/00 47/62 N |
| 2009/0313894 A1 * | 12/2009 | Bieber | ................... | A01G 31/00 47/62 R |
| 2009/0326723 A1 * | 12/2009 | Moore | .................... | A01G 25/16 700/284 |
| 2010/0042234 A1 * | 2/2010 | May | ........................ | A01G 7/00 700/90 |
| 2010/0076620 A1 * | 3/2010 | Loebl | ....................... | A01G 9/26 700/306 |
| 2012/0109387 A1 * | 5/2012 | Martin | ................. | A01G 25/167 700/284 |
| 2012/0109614 A1 * | 5/2012 | Lindores | .............. | A01B 79/005 703/11 |
| 2012/0261486 A1 | 10/2012 | Sarver et al. | | |
| 2012/0282111 A1 * | 11/2012 | Nip | ........................ | F04B 49/06 417/48 |
| 2013/0006401 A1 * | 1/2013 | Shan | ..................... | H04L 67/125 700/90 |
| 2013/0060473 A1 | 3/2013 | Tomida | | |
| 2013/0113924 A1 * | 5/2013 | Moon | ................... | G01J 1/0219 348/135 |
| 2013/0214937 A1 * | 8/2013 | Petite | ..................... | G01D 4/004 340/870.03 |
| 2013/0226357 A1 * | 8/2013 | Ersavas | ................ | A01G 25/167 700/284 |
| 2013/0283689 A1 * | 10/2013 | Walliser | ................ | A01G 31/02 47/62 R |
| 2013/0310992 A1 * | 11/2013 | Larsen | .................... | A01G 25/16 700/284 |
| 2014/0026474 A1 * | 1/2014 | Kulas | .................... | A01G 22/00 47/1.7 |
| 2014/0200690 A1 * | 7/2014 | Kumar | .................. | A01G 22/00 700/90 |
| 2014/0278144 A1 * | 9/2014 | Risk | ..................... | G01N 21/3504 702/24 |
| 2014/0324490 A1 * | 10/2014 | Gurin | .................. | G06Q 10/0631 705/7.12 |
| 2015/0089866 A1 * | 4/2015 | Abbott | ..................... | A01G 9/00 47/58.1 LS |
| 2015/0100168 A1 * | 4/2015 | Oliver | ..................... | A63F 13/245 700/284 |
| 2015/0204787 A1 * | 7/2015 | Kramer | .............. | G01N 21/6408 250/459.1 |
| 2015/0233530 A1 * | 8/2015 | Sandidge | .................. | F17D 3/01 166/90.1 |
| 2015/0278719 A1 * | 10/2015 | Schueller | ................ | G06Q 10/063 705/7.11 |
| 2015/0309496 A1 * | 10/2015 | Kah, III | .................. | A01G 22/00 700/284 |
| 2015/0342125 A1 * | 12/2015 | Krijn | ..................... | A01G 7/045 315/152 |
| 2016/0033943 A1 * | 2/2016 | King | ..................... | G05B 13/021 700/28 |

(56) References Cited

U.S. PATENT DOCUMENTS

| | | | | |
|---|---|---|---|---|
| 2016/0143228 | A1* | 5/2016 | De Groot | A01G 9/24 |
| | | | | 700/284 |
| 2016/0235013 | A1* | 8/2016 | Pohjanvouri | A01G 22/00 |
| 2016/0345517 | A1* | 12/2016 | Cohen | A01G 31/02 |
| 2017/0359974 | A1* | 12/2017 | Whalley | A01G 25/162 |
| 2017/0366879 | A1* | 12/2017 | Fu | H04Q 9/02 |
| 2020/0003202 | A1* | 1/2020 | Levine | F04B 41/02 |

FOREIGN PATENT DOCUMENTS

| | | |
|---|---|---|
| EA | 14993 B1 | 4/2011 |
| EP | 2111746 | 10/2009 |
| EP | 2243352 | 10/2010 |
| EP | 2243353 | 10/2010 |
| EP | 2243353 A1 | 10/2010 |
| JP | 04135427 A | 8/1992 |
| JP | 2002297690 A | 11/2002 |
| JP | 2006527356 A | 11/2006 |
| JP | 2007122433 A | 5/2007 |
| JP | 2013051926 A | 3/2013 |
| RU | 2448455 C2 | 4/2012 |
| WO | 03005807 | 1/2003 |
| WO | 03040985 | 5/2003 |
| WO | 2008009463 A1 | 1/2008 |
| WO | 2010031773 | 3/2010 |
| WO | 2013093084 | 6/2013 |

OTHER PUBLICATIONS

Australian Examination Report dated Aug. 10, 2016 for corresponding AU Application No. 2014286114.
Canadian Office Action dated Feb. 13, 2017 for corresponding CA Application No. 2,915,442.
Chinese Office Action dated Jul. 4, 2017 for corresponding CN Application No. 201480038354.3.
Chinese Office Action dated Nov. 22, 2016 for corresponding CN Application No. 201480038354.3.
Japanese Office Action dated Mar. 15, 2017 for corresponding JP Application No. 2016-522643 with English translation.
Russian Office Action dated Mar. 3, 2017 for corresponding RU Application No. 2412-531039RU/4232.
International Search Report to corresponding International patent application No. PCT/EP2014/064319, dated Sep. 4, 2014, 3 pages.
Chinese Office Action for corresponding Chinese Application Serial No. 201480038354.3, dated Aug. 2, 2018, pp. 1-11.
Japanese Office Action for corresponding Japanese Application Serial No. 2015-522643, dated Jan. 24, 2018, pp. 1-5.
Re-examination Notice dated Dec. 25, 2019 for corresponding Chinese Patent Application No. 201480038354.3.
"Illustration of Water-Saving Irrigation Techniques for Vegetables and Fruits", Chapter IV Section III: Intelligent Irrigation System; edited by Zhang Baodong, pp. 38-39, Jindun Press, Feb. 2012.
A2 ("General Theory of Gardening", edited by Ma Kai, Higher Education Press, Jul. 2001, pp. 184-186).

* cited by examiner

PLANT GROWTH SYSTEM

RELATED APPLICATIONS

The present application is a U.S. National Stage under 35 USC 371 patent application, claiming priority to Serial No. PCT/EP2014/064319, filed on Jul. 4, 2014, which claims priority from EP 13175294.1, filed on Jul. 5, 2013, both of which are incorporated herein by reference.

FIELD OF THE INVENTION

The present invention relates to the growth of plants in hydroponic growing systems, including artificial substrates. In particular, but not exclusively, the present invention relates to a system and method for monitoring plant growth conditions, more particularly plant growth conditions in mineral wool substrates used for plant growing.

BACKGROUND TO THE INVENTION

Hydroponic growing systems are known in the art for the purpose of growing plants using mineral nutrient solutions, without soil (i.e. soilless cultures). Plants in hydroponic growing systems may be grown in substrates of various types, such as mineral wool, glasswool, cocopeat (coir), or peat slabs, for example.

It is known that plants can be grown in mineral wool growth substrates. Such growth substrates are typically provided as a coherent plug, block, slab or mat/blanket and generally include a binder, usually an organic binder, in order to provide structural integrity to the product.

Typically, the growth process of the plant is managed in two stages: a first stage managed by a "propagator" in which the plant is grown from seed; and a second stage managed by a "grower" during which the plant is sustained and any harvest taken. For example, in the case of the tomato plant, the propagator may plant individual tomato seeds in cylindrical plugs having a thickness in the order of 25-30 mm and a radius of around 20-30 mm. After germination of the seed, the propagator places the plug within a cuboid block to allow further growth of the root system and the plant. The individual plant within the block is then nursed until a stage when it can be transferred from the propagator to the grower.

Although often only a single plant is provided in each block, it is possible for multiple plants to be provided in a single block. In some examples, a single plant in a block is split into two by splitting a stem during an early phase of growth, resulting in two plants sharing a single root system. In another alternative, multiple plants may be grafted together and grown within a single block.

The use of a separate plug and block by the propagator is not essential for all plants, but has been described, for example, in European patent application EP2111746, as providing a number of advantages. In particular, the small size of the plug allows more regular watering of the plant in the initial stage without saturating its substrate.

After they are received from the propagator, the grower places a number of blocks on a single slab of mineral wool to form a plant growth system. The slab of mineral wool is typically encased in a foil or other liquid impermeable layer except for openings on an upper surface for receiving the blocks with the plants and a drain hole provided on the bottom surface.

During subsequent growth of the plant, water and nutrients are provided using drippers which deliver a liquid containing water and nutrients to the system either directly to the blocks or to the slabs. The water and nutrients in the blocks and slabs is taken up by the roots of the plants and the plants grow accordingly. Water and nutrients which are not taken up by the plant either remain in the substrate system or are drained through the drain hole.

There is a desire to use water and nutrients as efficiently as possible during the growing process. This is both for cost and environmental reasons. In particular, the nutrients are expensive to obtain, while waste water containing such nutrients is difficult to dispose of due to environmental legislation. These pressures will increase as raw materials (particularly fertilisers such as phosphates) become increasingly scarce. The desire to avoid such waste is matched by a desire to improve plant growth conditions, and thereby to increase the yield and quality of fruit obtained from plants in this manner.

The use of mineral wool itself provides significant benefits in this regard as compared to traditional soil-based growing methods, but there is an ongoing requirement to further improve these characteristics. In particular, there is a conflicting desire to both produce more and consume less in plant growth processes. That is, a greater yield from the plants is desired while at the same time reducing the amount of water and/or nutrients that are used. In practice, existing growing methods and/or substrates provide limitations on both these aspects.

Important qualities of plant growth systems in this context include their water retention, re-saturation and water/nutrient distribution. The water retention reflects the quantity of water that can be retained by the system while the water distribution reflects the location within the slab of the water and nutrients that are present. The re-saturation refers to the tendency of newly added liquid solution to add to the water and nutrient levels of the substrate rather than replace existing solution or be spilled.

Particular considerations which affect water retention, water distribution and re-saturation include the effect of gravity, which tends to force water downwards and thus towards the drain hole, and capillary effects which can cause water to be drawn upwards. In practice, the slabs are typically provided on a slight slope, with the drain hole located at the lowest end of the bottom surface, helping to ensure that gravity forces the water towards the drain hole. In addition to gravity and capillary effects, the flow resistance of the medium should be considered, which has the effect of preventing water passing through the slab from the drippers to the drain hole. Overall, if root and plant development is to be optimised, then it is necessary to ensure that optimal conditions are found in the region of the substrate in which the roots are growing.

As would be expected, sub-optimal water retention in the substrate can lead to either a shortage or an excess of water. In the case of shortage, this leads to water being lost, and thus wasted, through the drain hole. The water distribution is also important since it is necessary for the water within the slab to reach the plant roots. For example, when a plant has recently been placed on the slab, the roots will extend slowly into the upper regions of the slab. If water fails to reach the roots, this will result in loss of growth speed and thus loss in production. In particular, in order to ensure that the plant roots in the top region of the slab are sufficiently watered, it may be necessary for the grower to provide excessive water to the slab to maintain sufficient water around the roots, leading to greater wastage through the drain hole and extra costs. Excessive water levels can also increase the risk of fungal growth on one hand or oxygen depletion on the other which may damage the plant.

An important factor in plant growth is the retention and distribution of nutrients. Although the nutrients are typically introduced with the water, they will not necessarily be distributed and retained by the slab in the same way. The nutrients typically comprise dissolved salts comprising nitrogen, phosphorus, potassium, calcium, magnesium and similar elements. The nutrients are dissolved in the water and their movement through the slab is affected by processes such as advection, dispersion and diffusion. Advection is the movement of nutrients with the water flow through the slab, dispersion is the mixing of nutrients that occurs as they travel through complex pore structures in the slab, and diffusion relates to random movement of particles within the slab and the statistical tendency this has to reduce concentration gradients.

As with the water itself, it is important that the nutrients reach the plant roots. If nutrients are poorly distributed, or are lost from the slab, then excess nutrients may be required in the slab as a whole for the plant to receive the nutrients it requires. This is of course a waste of nutrients.

Another consideration that plays a role in plant growth on man made substrates is the nutrient refreshment efficiency (i.e. irrigation efficiency to refresh nutrients). This relates to whether the introduction of new nutrient solution will flush out existing nutrients in the slab. In some circumstances, it may be desirable to change the nutrient concentration within the slab during the growth process. The ability to do this will depend on whether existing nutrients can effectively be replaced through the whole slab or at least the region of the slab in which root growth takes place. Moreover, in some examples a build-up of nutrients if they are not replaced can reach levels which can cause dehydration or are at least non-ideal for plant growth.

In view of this, it is recognised that the amount of water and nutrients provided to a plant plays a critical role in plant growth. This choice is typically made by analysing external factors, such as hours of sunshine or temperature and inferring the likely behaviour of the system (in terms of evaporation etc.).

It is known to measure the water and/or nutrient content within a plant growth substrate. For example, international patent application WO2010/031773 describes a water content measuring device which determines the water content of a mineral wool substrate by measurement of a capacitance. Similarly, international patent application WO03/005807 describes a process for measuring the oxygen level in the water in a plant growth substrate. However, although such techniques can provide useful information to the grower, they do not in themselves ensure improved water, nutrient and oxygen content and distribution within the slab. Further, implementation of such systems can require multiple instances of expensive components to be installed at relatively high expense to the user, and redeployment of those systems, to save costs in measuring multiple areas or growing systems can be time consuming and labour intensive.

U.S. Pat. No. 4,015,366 describes wired sensing and fluid delivery systems with sensors located in an agricultural production area. The sensors measure the levels of nitrate, phosphate, or potassium in the soil of the agricultural production area to determine if the level of one or more of these components in the soil is sufficient. Based on the sensor readings, a nutrient distribution cycle may be activated. US patent application US2007/082600 describes a handheld device comprising sensors and probes which is used to measure and display climate and/or soil parameters. Although such systems and devices can provide useful information about agricultural soil composition and can help with the automation of irrigation of the soil, they do not provide solutions for effective management of water and water/nutrient distribution in hydroponic growing systems such as mineral wool substrates.

There is a continuing requirement to improve upon the systems available to a user for managing the irrigation of plants during plant growth in hydroponic growing systems. Substrates in hydroponic systems often have a fixed volume, unlike soils and transport in soils, in which water can spread out over an unlimited substrate volume, in any direction. Existing techniques often result in the loss and/or overfeeding of water and/or nutrients as they are unable to offer suitable and flexible monitoring and control of growing conditions, nor sufficiently accurate and adjustable response strategies and reconfiguration of existing systems can be labour intensive and can induce errors due to the numerous steps involved in reconfiguring individual elements of a system separately and individually.

SUMMARY OF THE INVENTION

In addressing the drawbacks of the prior art, the present invention provides a system for controlling plant growth conditions comprising:
  at least one detector; and
  central detector data processing means;
  the or each detector being arranged to measure a property or properties indicative of a temperature, a water content, and a nutrient content, of a plant growth substrate;
  the or each detector being further arranged to transmit a detector identifier and the measured property or properties over a communications link to the central detector data processing means;
  the central detector data processing means being arranged to:
    hold in a memory predefined irrigation data defining a relationship between:
    plural values for one or more of temperature, pH level, water content and/or nutrient content of the substrate; and
    plural desired irrigation output values;
    process the measured properties received from each detector to determine calculated properties of the substrate; and
    provide an output indicative of a desired irrigation input for the growth substrate, based upon calculated properties received from the detector or detectors and the predefined irrigation data.

The transmission of measured properties to a central processing means for conversion and for use in creating an output indicative of a desired irrigation input for the substrate allows more flexible and more accurate control of growth conditions, which can be easily and centrally reconfigured in response to new data or in response to other influencing factors such as environmental factors or changes to plants or substrates or other materials used in the system. One or more detectors may be used in the system and preferred embodiments may include 3 to 5 detectors. Advantageously, the system may be deployed wirelessly in the monitored area as will be described in more detail below.

Accordingly, the present invention uses properties indicative of temperature (i.e. root temperature), water content, and nutrient content, determining electrical conductivity of fluid in the substrate, for example, to accurately determine nutrient content in the artificial substrate as opposed to individual element levels. Unlike existing systems, therefore, the present invention provides a solution to the water waste problem specific to soilless cultures of hydroponic systems. As discussed above, substrates in hydroponic systems often have fixed water volumes, unlike soils and transport in soils, in which water can spread out over an unlimited substrate volume, in any direction. The fixed water volumes of hydroponic systems are typically around 1-30 litre per m$^2$, most commonly between 4-15 litre per m$^2$. Per plant, the fixed water volumes are typically between 1.5-10 litre. The fixed water volumes in hydroponic systems are also rather small when compared to the rooting areas of plants in soil.

Soilless substrates in hydroponic systems may be located on top of the soil, on gutters, moving tables etc. The relatively smaller water volumes in combination with growing out of soil makes it possible for growers to collect the excess of water, disinfect the water and re-use the water to apply new nutrient solutions. The amount of water drained is relatively small (e.g. 20-60 m$^3$ per ha on a summer day). With existing disinfection systems (using e.g. pumps specific for this purpose) the collected drained water can be disinfected typically within 24 hours, so that it is ready for use the next day.

In artificial substrates, for example, the suction pressure applied by plants for water uptake is commonly in the range between pF 0 and 2, most common between pF 0 and 1.5. Although water uptake by plants in this range is unlimited, differences in this range can determine differences in dry matter distributions in plants. In contrast, in agricultural soils, normal pF ranges are between pF 2 and pF 4,2 (applied suction pressure by plants is between 100 and 16000 atm). In this range we talk about water availability for plants rather than effects on distribution of dry weight.

The system may further comprise a portable detector communication device configured to: process measured properties received from a detector of the system, to determine calculated properties of the substrate; and display the calculated properties to a user. Further inclusion of a portable detector communication device in the system allows checks and testing of individual components of the system to be carried out and allows easier set-up of the system since a user can place detectors out in the growth area and check outputs without a need to return to a central computer or processing device to check on or update configuration and performance of the system.

The portable detector communication device may be further arranged to: receive detector data from a detector of the system; and transmit detector data to the central detector data processing means. This can allow a user to check detector data relating to an output or of a status of a detector in the growing area and further forward the received data to the central detector data processing means to store data for later analysis, or to update inputs or configuration data to the system after correction, or updating of, installation or configuration of components of the system.

The central detector data processing means may be further arranged to: process the measured properties received from each detector to determine a nutrient content of a substrate associated with each detector; and provide an output indicative of a desired irrigation input for the growth substrate, based upon the calculated nutrient content of the substrate. Steering irrigation input based upon nutrient content is not known since other inputs are generally used, such as detected radiation or detected water levels. The use of nutrient levels to steer irrigation reflects a recognition that, at least at times, the water content level should not be maintained at a certain point if it has a detrimental effect on nutrient level. For example, when a deliberate effort is undertaken to reduce the water content level within a substrate, there is a risk that an increased nutrient level will result. It has therefore been recognised as inappropriate to ignore nutrient level when enacting control of the water content level. In preferred embodiments, a property indicative of nutrient content is the electrical conductivity of fluid in the growth substrate.

The portable detector communication device may further be configured to: receive a detector identifier from a detector of the system; receive detector data relating to the detector; and transmit the detector identifier and the detector data to the central detector data processing means. This allows flexible input of detector data to central processor means of the system without a need to be present at the central detector data processor means, so that configuration can be carried out more efficiently out in the growing area.

The portable detector communication device may be further configured to: receive, by user input, user defined detector data; associate the user defined detector data with the detector identifier; and transmit the detector identifier and the user defined detector data to the central detector data processing means.

Inputting user data allows a user to define data for a detector and transmit the data to the central detector data processing means for a remote location, so that configuration can be carried out more efficiently out in the growing area.

The data associated with the detector identifier may include any or all of: location data of the detector; a power status of the detector; a status of a communication link between the detector and the central detector data processing means; information indicating a type and/or size of the growth substrate measured by the detector; and/or a property or properties of the growth substrate measured by the detector. Some or all of the above data may be either transmitted by the detector or input to the portable detector communication device by a user.

The portable detector communication device may be further configured to: receive measured properties from the detector; associate the measured properties with the detector identifier of the detector; and transmit the detector identifier and associated measured properties to the central detector data processing means of the system. This can allow a user to check detector outputs in the growing area and further forward them to central processing means to store data for later analysis, or to update inputs or configuration data to the system after correction or updating of installation or configuration of components of the system.

The portable detector communication device may further comprise location determining means, for determining location data of the device or a detector, and being further configured to: associate the identifier of the detector with determined location data; and transmit the detector identifier and associated location data to the central detector data processing means of the system. This allows locations of the detector or detectors of the system to be sent to the central detector data processing means without the need to return to the central detector data processing means.

The invention further provides a method of controlling plant growth conditions, comprising: providing a system according to the present invention; and controlling an irrigation input to a plant growth substrate based upon the output indicative of a desired irrigation input for the growth substrate provided by the central detector data processing means of the system.

The method may further comprise inputting detector configuration data to the portable detector communication device of the system and causing the portable detector communication device to transmit the detector configuration information to the central detector data processing means.

A portable detector communication device is also provided, for use in a system according to the invention, wherein the device is configured to: process measured properties received from a detector of the system, to determine calculated properties of the substrate; and display the calculated properties to a user. This further allows the outputs of detectors to be processed as they would be in the central detector processing means, while a user is out in the growing area, so that configurations can be checked and outputs can be compared, if desired, to different conversion models of factors which may be stored in the portable detector communication device.

The invention further provides a computer program product, loadable into a memory of an electronic communication device, and containing instructions which, when executed by the electronic communication device, cause it to be configured as the claimed portable detector communication device.

A detector for a system according to the invention is further provided, wherein the detector is configured to:

measure properties indicative of at least one of a temperature, a water content, and a nutrient content, of a plant growth substrate;

transmit the measured property or properties over a communications link to the central detector data processing means for conversion to a value of temperature, a water content, and a nutrient content, of a plant growth substrate.

The detector may be further configured to transmit to the portable detector communications device a detector identifier, and/or one or more of: measured properties indicative of at least one of a temperature, a water content and a nutrient content, of a plant growth substrate; a power level status; a communications link status. These steps may be carried out in response to an interrogation signal from the portable detector communications device.

A central detector data processing means for the system of the invention may be provided and may be arranged to:
  receive a measured property or properties from the detector or detectors over a communications link;
  store predefined irrigation data, defining a relationship between:
  plural values for temperature, water content, and nutrient content of the plant growth substrate; and
  plural desired irrigation output values;
  process the measured properties from each detector to determine calculated properties of the substrate; and
  provide an output indicative of a desired irrigation input for the growth substrate, based upon measured properties received from the detector or detectors and the predefined irrigation data.

The central detector data processing means may further be arranged to receive detector information associated with one or more detectors of the system from a portable detector communications device and to store the configuration information in a data storage means.

A number of factors monitored by detectors of the system may be influential, either alone or in combination with the nutrient level, and those factors may vary across a large plant growing system. The system of the present invention enables a user to implement a low cost system and to quickly and easily redeploy the equipment or detectors to different areas of the greenhouse or other growing area so that conditions can be monitored in multiple areas quickly and easily without the need to buy new equipment for each area.

The present invention can provide a feedback system that can be used to closely and reliably monitor the nutrient level in the slab and control the applied water in dependence on this level. The nutrient levels in the one or more substrates are monitored directly. For example, by taking measurements within the substrate rather than indirectly by measurement of water drained from the substrate or some other technique. This provides a system in which the environment of each plant can be controlled to provide the maximum outcome for a given supply of water and/or nutrients.

Rather than relying upon incident radiation levels, as in conventional systems, the present invention can use the nutrient level and/or the temperature in the substrate—and may also use the water content or pH level in the substrate—as critical set points in decision making for irrigation. In traditional cases, more incident light automatically leads to more irrigation. In contrast, the present invention allows a decision on whether to irrigate or not to be based not on the light level, or at least not only on the light level, but on direct measurement of the substrate.

The substrates are preferably MMVF substrates, although other substrates may be used. In preferred embodiments, each substrate comprises a slab and a single block (preferably an MMVF slab and a single MMVF block). That is, one and only one plant-containing block is provided on each slab, meaning that the control of the water and/or nutrient content within each slab can be much more accurately managed than in systems where plants are provided in multiple blocks which may compete for resources from the slab. It is recognised that the use of a single block allows a feedback system which can more accurately measure the relevant nutrient level and therefore provide more accurate control of the applied water and nutrients in dependence on these characteristics.

Preferably, the one or more detectors are further arranged to monitor water content levels of at least one of the plant growth substrates, and the supply of water by the at least one irrigation device is controlled in dependence on the monitored water content levels. In this manner, the water supply is accurately controlled based on both the nutrient levels and the water content levels actually observed in the substrates.

In addition to control of the supply of water by the at least one irrigation device, the control means may also control the supply of nutrients by the at least one irrigation device. Such control may be enacted in dependence on the measured water content and/or nutrient levels. Temperature may also be a factor taken into account by the controller when controlling irrigation rates and cycles.

In preferred embodiments, the one or more detectors are further arranged to monitor the distribution of at least one of: water and/or nutrients within at least one of the plant growth substrates. Preferably, the supply of water and/or nutrients is controlled so as to increase uniformity of the monitored water, nutrient and/or oxygen distribution. Thus, not only is the quantity of such materials known, but so is information about how they are distributed within and/or between the block and/or slab of a given system. This provides an extra layer of detail that can be utilised to ensure that appropriate water and nutrients are provided.

The benefits of improved distribution of water and/or nutrients are particularly significant during an early stage when a plant-containing block is newly placed on the slab. At this point it is important that the first layer contains enough water and nutrients to secure a good rooting within the slab. This allows positive root development to secure optimal and healthy plant growth. Beneficially, not only does the slab of the present invention allow sufficient water and nutrients to be provided, but it also allows the level water and nutrients in the vicinity of the roots to be closely controlled. This can help to avoid over-feeding the plant which can reduce the growth of fruit and/or vegetables.

The man made vitreous fibres (MMVF) of the present invention may be fibre glass, mineral wool or refractory ceramic fibres. In preferred embodiments, the MMVF is mineral wool, e.g. such as stone wool.

One or more detectors or sensors may be applied to a single slab or substrate. Further, one or more detectors may be distributed across several slabs or substrates. The system can also be effective with a single detector or sensor.

The one or more detectors may be fixed relative to the substrates. That is to say, the one or more detectors may be permanently in position and thus do not need to be re-mounted each time water or nutrient levels are monitored. In the context of single blocks on each slab it can be understood that this permanence to the control system can be established. In particular, automated control of plants and/or nutrients can be used to provide the ideal levels to each plant within the system.

The nutrient level may reflect the overall level of all nutrients in the substrate, the levels of some particular nutrients, or the level of a single nutrient. The present invention is not limited to any one implementation in this regard.

The one or more detectors may be arranged to regularly monitor the water and/or nutrient content of at least one of the plant growth substrates. For example, these levels may be monitored at regular intervals. In an alternative, the one or more detectors may be arranged to measure the water and/or nutrient content continuously.

Preferably, the one or more detectors are arranged to monitor both the water and nutrient content of at least one of the plant growth substrates.

In some preferred embodiments, the one or more detectors are further arranged to monitor the temperature of at least one of the plant growth substrates, and the supply of water and/or nutrients by the at least one irrigation device is further controlled by the control means in dependence on the monitored temperature.

Preferably, the one or more detectors are arranged to determine the nutrient content from an electrical conductivity of fluid in or drained from at least one plant growth substrate. The electrical conductivity provides an accurate indication or the number of salts, and thus ions, in a fluid. This provides a good indication of the nutrient level.

The system of the present invention can be used in any plant growth system and can be implemented with essentially any plant growth substrate, which may comprise natural or man-made materials and which may be implemented in a managed environment such as a greenhouse, in plastic tunnels or in an external environment. The benefits of the invention can be realised in essentially any agricultural or horticultural application where the growth conditions described herein are to be monitored.

In some preferred embodiments, the system may be implemented with a substrate which is a slab, and which has a volume in the range of 3 to 20 litres.

Preferably, the slab has a volume of 5 to 15 litres, more preferably 5 to 11 litres, and in a particular preferred embodiment the slab has a volume of 6 to 8 litres. Such a relatively small volume allows close control of water and nutrient levels without being so small as to prevent desired root growth.

The size of the slab also allows more effective control of water and nutrient levels compared to conventional, larger slabs. Unlike previous slabs, which are typically designed to receive multiple plant-containing blocks on an upper surface, the slab of the present invention is in preferred embodiments arranged for use with a single plant-containing block. In this way, the water and nutrients provided to an individual plant, or plants from an individual block, may be closely managed. This allows the level of water and nutrients provided to the plant to be optimised, in particular for generative growth strategies that offer a greater yield and less waste than vegetative strategies.

In some preferred embodiments, each plant growth substrate further comprises a single MMVF plug disposed within the MMVF block. The plug can be used to grow the plant from seed before being engaged with the block.

Preferably, the MMVF slab comprises a first layer of MMVF in interfacial contact with a second layer of MMVF, the first layer having a greater density than the second layer. The provision of separate densities has been found to increase control over the distribution of water and nutrients in the substrate. In preferred embodiments, the first layer of MMVF has a density in the range 40 $kg/m^3$ to 90 $kg/m^3$ and the second layer of MMVF has a density in the range 35 $kg/m^3$ to 85 $kg/m^3$. More preferably, the density of the first layer is in the range 50 $kg/m^3$ to 80 $kg/m^3$ and/or the density of the second layer is in the range 45 $kg/m^3$ to 75 $kg/m^3$. In a particularly preferred embodiment, the density of the first layer is 70 $kg/m^3$ and the density of the second layer is 50 $kg/m^3$. These densities are found to offer good properties for plant growth, including water and nutrient retention.

The density of the second layer may be less than that of the first layer. Preferably, the density of the second layer is at least 5 $kg/m^3$ less than that of the first layer, more preferably at least 10 $kg/m^3$, and most preferably around 20 $kg/m^3$. This contrast between the densities of the layers assists in ensuring that water and nutrients are suitably distributed through the slab, and in particular can help to avoid an excessive proportion of water and/or nutrients being found in the second layer.

In some preferred embodiments, the substrate comprises a hydrophilic binding system and/or a binding system comprising an organic binder selected from formaldehyde free binders. The binding system may comprise the binder and a wetting agent, or may comprise the binder alone. By ensuring that the binding system is hydrophilic, the water retention properties of the slab can be improved relative to binding systems which are non-hydrophilic or hydrophobic.

Preferably, the binder comprises the reaction product of a polycarboxylic acid component and a polyol and/or an amine component, preferably in admixture with a sugar component and/or a phenol. More preferably, the binder is a reaction product of a polycarboxylic acid or anhydride thereof, an amine, preferably an alkanolamine, and a sugar, preferably a reducing sugar. These binders are found to offer particularly advantageous properties in MMVF slabs.

The MMVF block is preferably provided in contact with the first layer. Moreover, the first layer is preferably above the second layer in use. Furthermore, water and nutrients are preferably provided to the block or to the first layer. In this way, water and nutrients may be received in the first, more dense layer. This has been found to offer good water retention and distribution properties.

In preferred embodiments, the thickness of the first layer is less than the thickness of the second layer. In preferred embodiments, a ratio of first layer thickness to second layer thickness is in the range 1:(1-3), preferably 1:(1.2-2.5), more preferably 1:(1.2-1.8). For example, the thickness of the first layer may be half the thickness of the second layer or more.

The preferred relative thicknesses of the first and second layers are found to offer close control of the water and nutrient retention throughout the substrate.

In preferred embodiments the block has a volume in the range of 50 ml-5000 ml and/or each block a density in the range of 30 kg/m$^3$-150 kg/m$^3$. These sizes and densities have been found to be effective for use in plant growth systems.

In preferred embodiments, the thickness of the first layer is less than the thickness of the second layer. Preferably, the thickness of the first layer is at least half the thickness of the second layer. These proportions are found to assist in maintaining a preferred distribution of water and nutrients in the slab.

In preferred embodiments, the predominant fibre orientation of the first and second layers is horizontal. In this context, horizontal means parallel to the interfacial contact between the first and second layers. In other preferred embodiments, the predominant fibre orientation of one or both of the first and second layers is vertical (i.e. perpendicular to the interfacial contact). For example, in a particularly preferred embodiment, the predominant fibre orientation of the first layer is vertical while the predominant fibre orientation of the second layer is horizontal. In an alternative embodiment, the predominant fibre orientation of the first layer may be horizontal while the predominant fibre orientation of the second layer is vertical. The fibre orientations can affect the flow speed of liquid through the slab. For example, horizontal fibre orientations can reduce the flow speed of liquid through the slab and have a consequent beneficial effect on the amount of liquid that is spilled.

BRIEF DESCRIPTION OF THE DRAWINGS

Preferred embodiments of the present invention will now be described with reference to the accompanying drawings, in which.

DETAILED DESCRIPTION

Figure 1:
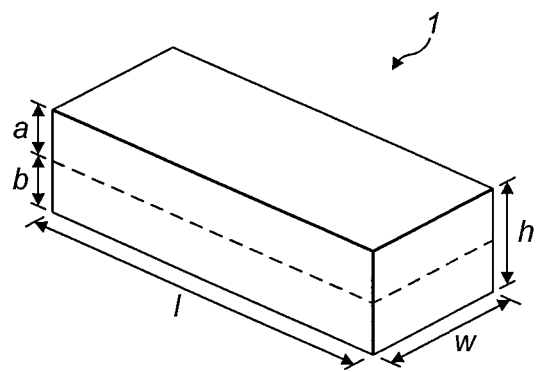
FIG. 1 illustrates a slab used for plant growth in accordance with a preferred embodiment of the present invention.

Referring to FIG. 1, there is shown a mineral wool slab 1 having a first layer of a first density disposed above a second layer of a second density. The slab 1 has a volume of 6.8 litres, although more generally for preferred embodiments the volume may be in the range of 3 litres to 20 litres, more preferably in the range 5 litres to 15 litres, and most preferably in the range 5 to 11 litres. Some embodiments comprise a slab with a volume in the range 6 litres to 8 litres. In other embodiments, the volume may lie in the range of 3 litres to 15 litres, or 3 litres to 10 litres, for example. An alternative preferred embodiment comprises a slab having a volume of 9 litres. The slab may comprise multiple layers, including a bottom layer and a top layer, whose growth conditions may vary relative to one another.

As is the case in the embodiment shown in FIG. 1, it is preferable that the height of the bottom layer is greater than that of the top layer. For example, the ratios between the heights of the top and bottom layers may be 1:(1-3), or preferably 1:(1.2-2.5). More preferably, this ratio is 1:(1.2-1.8).

The use of two differing densities in the slab of the preferred embodiment, together with its relatively small size, have been found to assist in the retention of water and nutrients and also ensuring that these are distributed substantially uniformly throughout the slab.

Figure 2:
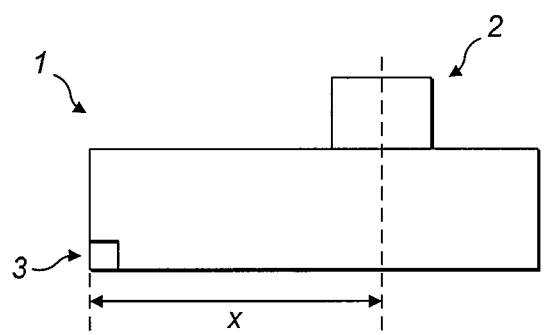
FIG. 2 illustrates a plant growth system comprising a block together with the slab of FIG. 1.

Referring now to FIG. 2, the slab 1 is shown with a block 2 positioned on its upper surface. The slab 1 further comprises a liquid impermeable covering around the mineral wool, the covering having two openings. Firstly, there is an opening on the upper surface to allow contact between the mineral wool of the slab 1 and the block 2. Secondly, there is an opening on a lower surface which acts as a drain hole 3.

The block 2 and the slab 1 are preferably formed of the same or a similar material. Thus the description below regarding the material of the slab 1 may equally be applied to the block 2. In particular, the block 2 may comprise stone wool and the binders and/or wetting agents described below.

The block dimensions can be chosen depending upon the plant to be grown. For example, the preferred length and width of a block for pepper or cucumber plants is 10 cm. For tomato plants, the length is increased to 15 cm or even 20 cm. The height of the blocks is preferably in the range of 7 to 12 cm, and more preferably in the range of 8 to 10 cm.

Therefore, preferred dimensions for pepper and cucumber range from 10 cm*10 cm*7 cm to 10 cm*10 cm*12 cm, and more preferably from 10 cm*10 cm*8 cm to 10 cm*10 cm*10 cm.

Figure 3:
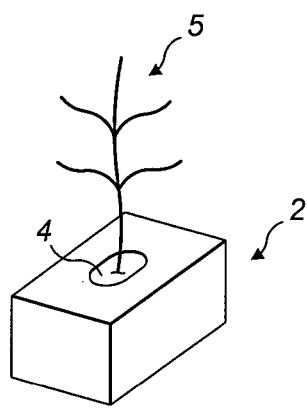
FIG. 3 illustrates the block of FIG. 2 together with a plug and a plant.

FIG. 3 illustrates a plant 5 in position within a plug 4 disposed within a block 2, such as that shown in FIG. 2. Like the block 2, the plug 4 is typically formed of a mineral wool with a binder and/or wetting agent as described below in the context of the slab 1.

In some embodiments, the plug 4 is not provided, and the seed is disposed directly within a hole in the block, from which the plant 5 subsequently grows. An example of a plant for which this approach is taken is the cucumber.

Preferably, the plant 5 is fruit or vegetable plant, such as a tomato plant or the like. In other preferred embodiments, the plant is a cucumber, aubergine or sweet pepper plant. The preferred embodiments of the present invention can assist in increasing the yield of fruit or vegetables from a plant and may also increase the quality of that fruit or vegetable by increasing the accuracy of the control of the growth conditions of the substrate in which the plant is growing.

As mentioned above, the slab 1 is, in some preferred embodiments, a mineral wool slab. The mineral fibres employed may be any man-made vitreous fibres (MMVF), such as glass fibres, ceramic fibres, basalt fibres, slag wool, stone wool and others, but are usually stone wool fibres. Stone wool generally has a content of iron oxide at least 3% and content of alkaline earth metals (calcium oxide and magnesium oxide) from 10 to 40%, along with the other usual oxide constituents of mineral wool. These are silica; alumina; alkali metals (sodium oxide and potassium oxide) which are usually present in low amounts; and can also include titania and other minor oxides. In general the product can be formed of any of the types of man-made vitreous fibre which are conventionally known for production of growth substrates.

The mineral wool is typically bound by a binding system which comprises a binder composition and additionally a wetting agent.

Figure 4:
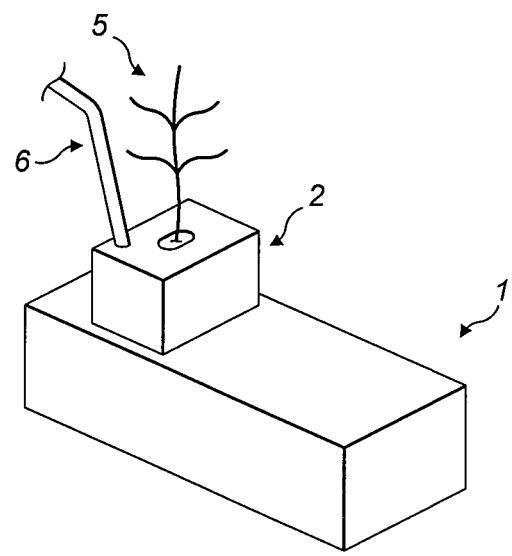
FIG. 4 illustrates a irrigation device in place next to the plant growth system of FIG. 2.

FIG. 4 shows a plant growth system comprising the slab 1, block 2 and plug 4 of FIGS. 1 to 3 and an irrigation device. The irrigation device 6 is arranged to provide a solution of water and nutrients to the system, either directly to the block or to the slab. In the preferred embodiment, the irrigation device is arranged to provide water and/or nutrient solution directly to the block 2. Since the block is disposed away from the drain hole 3 (as described above with reference to FIG. 2), solution from the irrigation device must pass more than 50% of the distance along the slab 1 before reaching the drain hole 3. In other preferred embodiments, the irrigation device may provide the water and nutrient solution to the slab 1 directly, but it is preferably arranged to do so either adjacent to the block or at a distal side of the block 2 relative to the drain hole 3.

The irrigation device 6 may be connected to separate nutrient and water reservoirs, and may be controlled to select the appropriate proportions of nutrients and water. Alternatively, a single combined nutrient and water reservoir may be provided such that the irrigation device provides liquid to the system having the same proportions of water and nutrients as are found in the reservoir.

Figure 5:
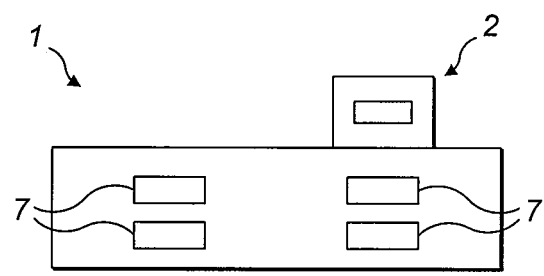
FIG. 5 illustrates the location of water and nutrient detectors on the plant growth system of FIG. 2.

The control of the irrigation device is preferably effected using a control system. The control system may control the irrigation devices providing nutrients and water to a plurality of plant growth systems each comprising a slab 1 upon which a plant-containing block 2 is placed. The control system is controlled on the basis of the detected water nutrient levels in one or more of the slabs. Additional control may be carried out on the basis of detected water content levels and/or temperatures in one or more slabs. The locations of the detectors 7 used to detect these levels in one embodiment are illustrated in FIG. 5. The detectors will typically comprise a body portion together with one or more, usually three or six probes, which extend from the body into the slab. The probes are typically made from stainless steel or another conductive material, and are used to measure the water content and/or electrical conductivity (EC) levels of the substrate by analysing the substrate's temperature, resistance and/or capacitance. The EC levels can be used to infer the nutrient level within the solution in the slab 1 as they reflect the ionic content of that solution.

Preferably, the EC level is maintained in the range 1.2 mS/cm to 8.5 mS/cm, more preferably in the range 2 mS/cm to 7 mS/cm. The preferred EC levels may be chosen according to crop type. If EC is to low (e.g. less than 1.2 mS/cm) the plant will starve for nutrients. If EC is in the range 2 mS/cm to 3.5 mS/cm, this will maximize production quantity. If EC is slightly higher this will result in better fruit quality (e.g. EC in the range 3.5 mS/cm to 5 mS/cm). If the EC is too high (for example, over 5 mS/cm for pepper and cucumbers or over 8.5 mS/cm for tomato) this will lead to fruit quality problems like Blossom End Rot. High EC implies that there will be high levels of Sodium and Chlorine in the substrate which can lead to a yield loss and need to discard the water from the greenhouse In prior art systems, the detectors 7 are placed on the upper surface of the slab 1, with the probes extending vertically through the slab. This approach is intended to provide a measurement which reflects the overall water or nutrient content across the vertical extent of the slab 1. However, in practice, such probes typically return results which are disproportionally influenced by the conditions in one or more areas of the slab 1, such as in the top portion of the slab. One reason this disparity can arise is because of variation in the EC level across the slab 1, which clearly affects the measured electrical properties such as resistance and/or capacitance from which, for example, the water content is calculated.

Further difficulties arise in prior art approaches due to the number of blocks 2 usually placed on a slab 1. It is often difficult to find positions on the slab 1 which are functionally equivalent for each block 2, particularly given the potential asymmetry in the system caused by the location of the drain hole 3 at one end of the slab 1.

In the system of the present invention, these difficulties can be overcome. In particular, FIG. 5 shows that the detectors 7 are disposed on the side of the slab 1 (i.e. the body portion of the detector 7 is disposed against a vertical face of the slab and the probes extend horizontally). This approach is available because of the improved water content and EC distributions within the slab 1. Since these are substantially uniform in the slab 1 of the preferred embodiment, the horizontal extent of the probes provides an accurate reading.

Indeed, while the slab 1 of FIG. 5 is illustrated with a plurality of detectors 7, this is not the case in all preferred embodiments. The array of detectors 7 shown in FIG. 5 allows measurement of the water content distribution and EC distribution, and has been used to analyse the slab 1 characteristics, providing results such as those detailed below. However, in practice it is found that only a single detector 7 may be required per slab, and detectors may be distributed around different slabs in a growing area to gain an illustrative indication of overall growth conditions for the area. This detector 7 preferably comprises horizontally extending probes located at a position offset from the block towards the drain hole 3.

Figure 6:
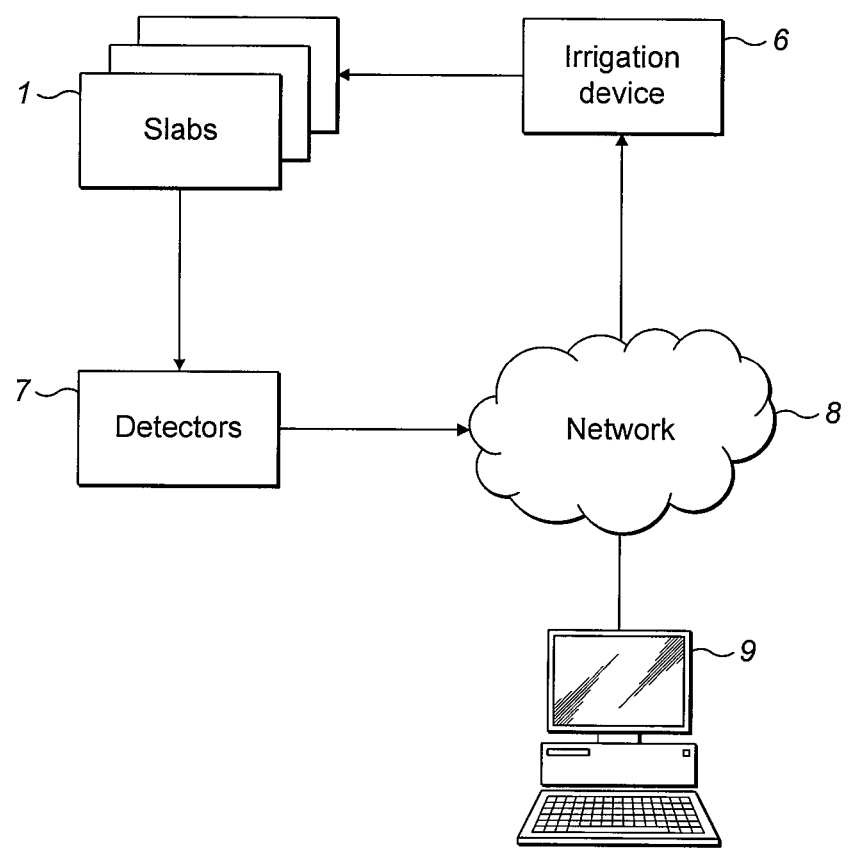
FIG. 6 shows schematically a plant growth control system comprises a plurality of the plant growth systems of FIG. 2.

The detectors 7 can be used to control the quantity of water and/or nutrients provided to the slab 1 by using a control system such as that illustrated in FIG. 6. The control system may also vary the concentration of nutrients within the solution provided by the irrigation devices 6 to the slabs 1. As can be seen from this Figure, the detectors 7 observe the data in the slabs 1, and communicate this across a network 8 to a control unit 9. The control unit then drives the irrigation devices (drippers) 6 across the network 8 in order to provide water and nutrients to the slabs 1. The control unit 9 can be programmed with a desired irrigation strategy (as discussed in more detail below) and can automatically ensure that the irrigation is carried out to control the nutrient levels in the slab 1 and may also control the water content levels in this manner. In this way, an automatic control of the irrigation process to provide a desired result is achieved.

Typically, each control system will comprise a large number of slabs 1. There may be detectors 7 placed on every slab 1, or there may be detectors placed on a selection of the slabs 1 to provide representative results. The detectors 1 are fixedly mounted to the slabs 1, in order that they can provide results to the control unit 9 at regular intervals. For example, the detectors may provide results at intervals of one minute, five minutes or another suitable time period. This allows the slabs 1 within the system to be constantly or periodically monitored so that they can be irrigated appropriately.

The irrigation devices 6 of the system may be controlled to apply a specific irrigation strategy. For example, such a strategy may comprise a number of distinct phases, designed to steer plants through generative and vegetative growth. As is understood in the art, generative growth refers to a type of growth in which the production of flowers/fruit is encouraged, while during vegetative growth the plant a higher proportion of leaves and other green elements are produced. Generative growth is encouraged when a plant has a relative lack of water a, while vegetative growth is encouraged by a plentiful supply of water. Vegetative growth produces the higher increase in overall biomass of the plant, while generative growth increases the proportion of the growth which contributes to the production of fruit or flowers.

It has been known to take advantage of these different growth types by applying irrigation strategies during which the preferred water content level varies. According to such an irrigation strategy, the plant growth substrate is watered each day in an attempt to reach a desired water content level. The water content of the substrate is measured as a percentage of the water content of the substrate when the substrate is fully saturated. Thus, a value of 0% represents a dry substrate, while a value of 100% represents a fully saturated substrate.

Typically, an irrigation strategy of this type comprises a number of distinct stages. Firstly, prior to placing the block 2 on the slab 1, the slab 1 is typically saturated or near-saturated with water. This helps to ensure that when the block 2 is first placed on the slab 1, root growth into the slab 1 is encouraged. At this point, however, the grower is anxious to ensure that the plant 5 provides fruit as soon as possible. In order to achieve this, the grower aims to impart a "generative impulse" (i.e. an impulse to initiate generative growth). This is done during a first period of the irrigation strategy, by reducing the desired water content down to a minimum level before increasing it again. The principle is that the reduction of water content will encourage generative growth of the plant and thus the flowering of the plant leading to fruit at the earliest available time.

After the generative impulse is applied, the grower wishes to return the plant to a sustainable phase of predominantly vegetative growth in order to obtain leaves and plant structure which will support the now growing fruit. Thus, towards the end of the first period of the irrigation strategy, the desired water content is increased. The desired water content level is increased until it reaches a sustainable value at which it is held substantially constant during a second period of the irrigation strategy.

In the second period, more vegetative growth is encouraged due to the higher water content in the substrate. The second period corresponds broadly to the summer season, during which the relatively high amount of sunshine causes the plants to transpire at a greater rate. Accordingly, a relatively high proportion of water must be provided to the plants. It should be recognised that although growth may be steered towards vegetative growth during this period more than at other periods, fruit continues to grow, although the rate is controlled by this steering. As the season turns to autumn and then winter, the transpiration rate reduces. As a result, it is no longer necessary to maintain the same water content in the substrate. Moreover, there is at this stage a desire to encourage further fruit growth before the plant reaches the end of the cycle. For both these reasons, the irrigation strategy may comprise a third period in which the water content level is reduced. The rate of reduction is relatively gradual.

The reduction in water content during the third period encourages generative growth in the plant, and thereby extends the season during which useful fruit can be obtained from the plant.

So, irrigation strategies can be used to attempt to steer the plant between generative and vegetative growth states in order to increase the yield of fruit obtained from the plant. Conventionally, this process has been carried out by driving water content levels within the substrate to desired levels.

However, it is now recognised that such control is not sufficient to offer optimum growing conditions. In particular, the inventors of the present invention have identified a link between variation of water content levels and the nutrient levels within the slabs that can lead to sub-optimal results. In particular, reduction in water content levels can lead to increased nutrient levels which it has been discovered can inhibit plant growth. Accordingly, in the present embodiments, the level of water provided to the slab is controlled with a dependence on nutrient levels in order to avoid unwanted effects.

Figure 7A:
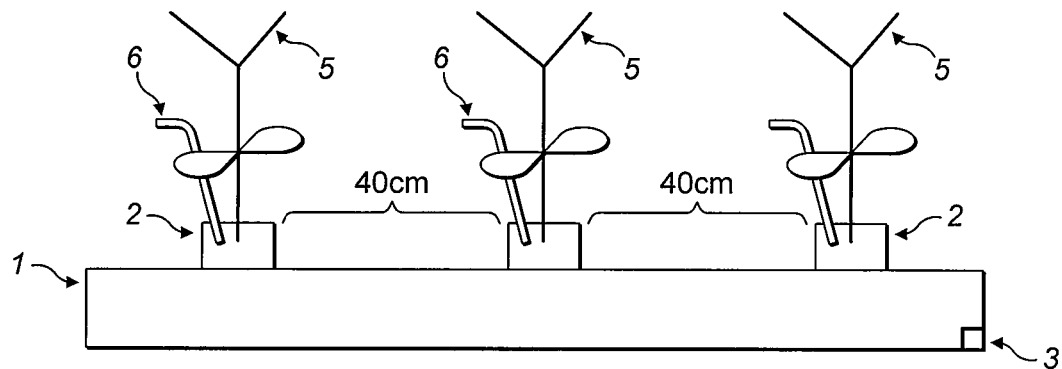
FIG. 7A illustrates a plant growth system according to a first example.
Figure 7B:
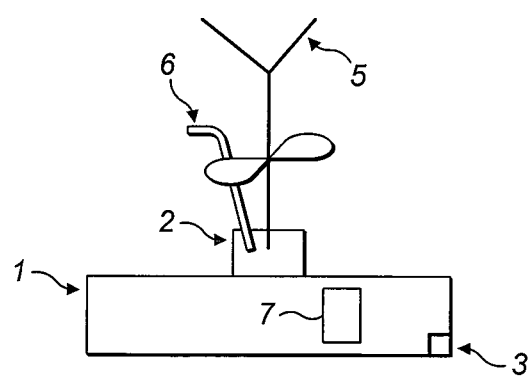
FIG. 7B illustrates a plant growth system according to a second example.

The relationship between water content and nutrient levels can be understood with reference to FIGS. 7A, 7B, 8, 9 and 10, which demonstrate the results of a long term study into the effects of irrigation strategies. FIGS. 7A and 7B illustrate two plant growth substrates used for comparison. The plant growth substrates were used to grow tomato plants. As can be seen from the figures, each system comprised a single drain hole at one end of the slab. The first example system of FIG. 7A comprises three separate blocks placed on the upper surface of the slab, whereas the second example system of FIG. 7B comprises only a single block.

The first example slab of FIG. 7A has dimensions of 1330 mm*195 mm*75 mm (length*width*height) while the blocks have dimensions of 100 mm*100 mm*65 mm (length*width*height). The blocks are located at positions of 150 mm to 200 mm, 650 mm to 700 mm and 1100 to 1150 mm along the slab away from the drain hole (as measured from the centre of the block) and irrigation devices are provided for each block to deliver a water and nutrient solution to the block at a distal side of the block to the drain hole.

The second example slab of FIG. 7B has dimensions of 450 mm*150 mm*100 mm (length*width*height) while the block has dimensions of 100 mm*100 mm*65 mm (length*width*height). The block is located 300 mm along the slab away from the drain hole (as measured from the centre of the block) and an irrigation device is provided to deliver a water and nutrient solution to the block at a distal side of the block to the drain hole.

Figure 8:
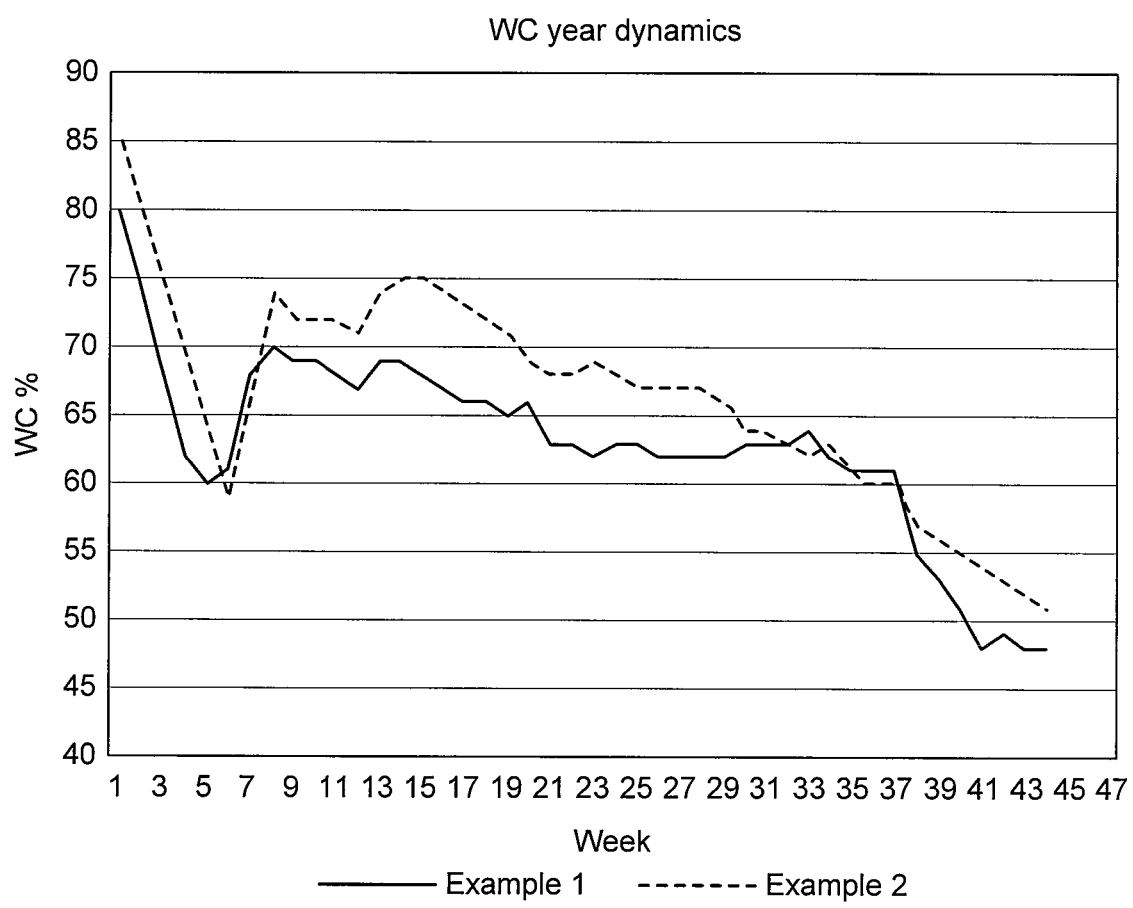
FIG. 8 illustrates a measured water content level in a plant growth substrate of the first and second examples over a long term study.

FIG. 8 illustrates the measured water content in the first example slab (dashed line) and the second example slab (unbroken line) over the course of the study.

It can be seen that during a first period the water content was reduced from an initial relatively high point, before subsequently increasing in line with the concept of a generative impulse as described above.

Figure 9:
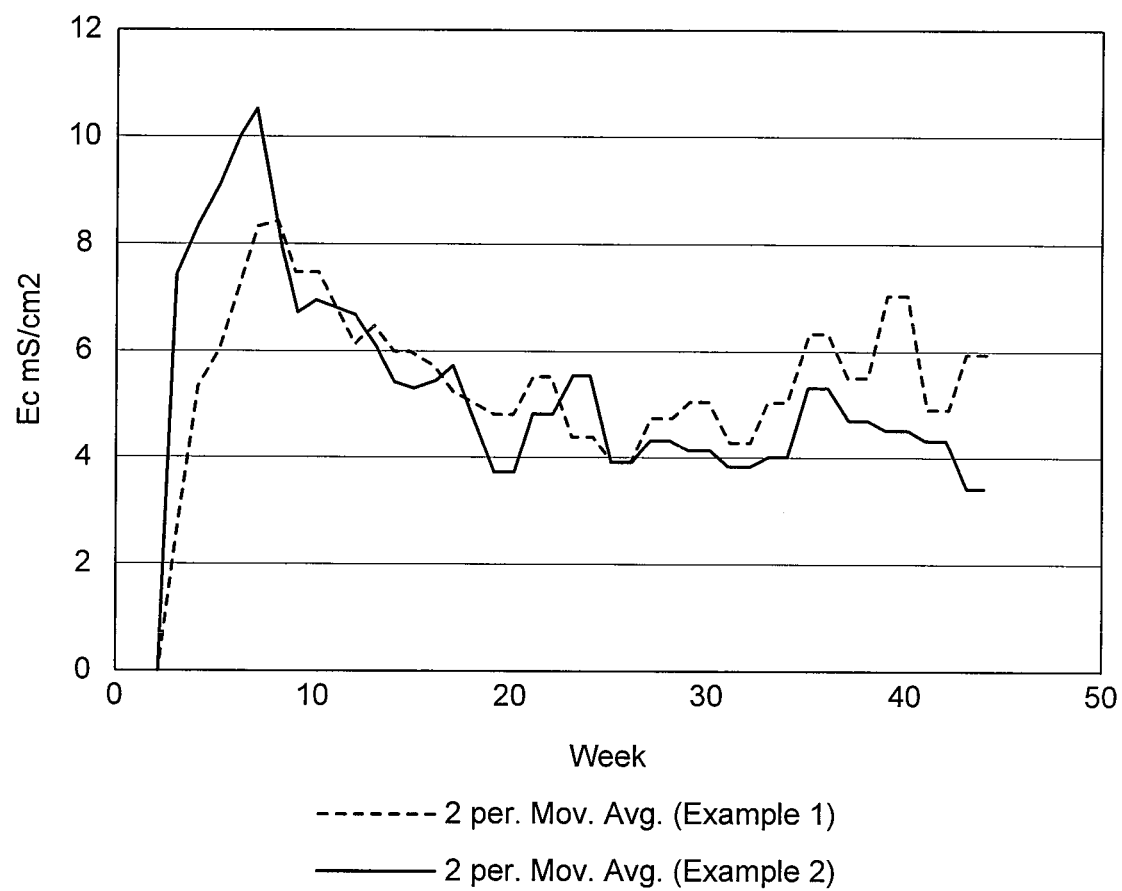
FIG. 9 illustrates the progression of EC level in a slab over a long term study.

FIG. 9 shows the measured EC level during the study for the first example substrate (dashed line) and the second example substrate (unbroken line). It will be recalled that the EC level represents the nutrient level in the slab. It is noticeable that the EC level rapidly increases during the initial phase in which the generative impulse is applied to the plants. This increase leads to a peak EC level above that which is generally expected during later phases of the irrigation strategy.

Figure 10:
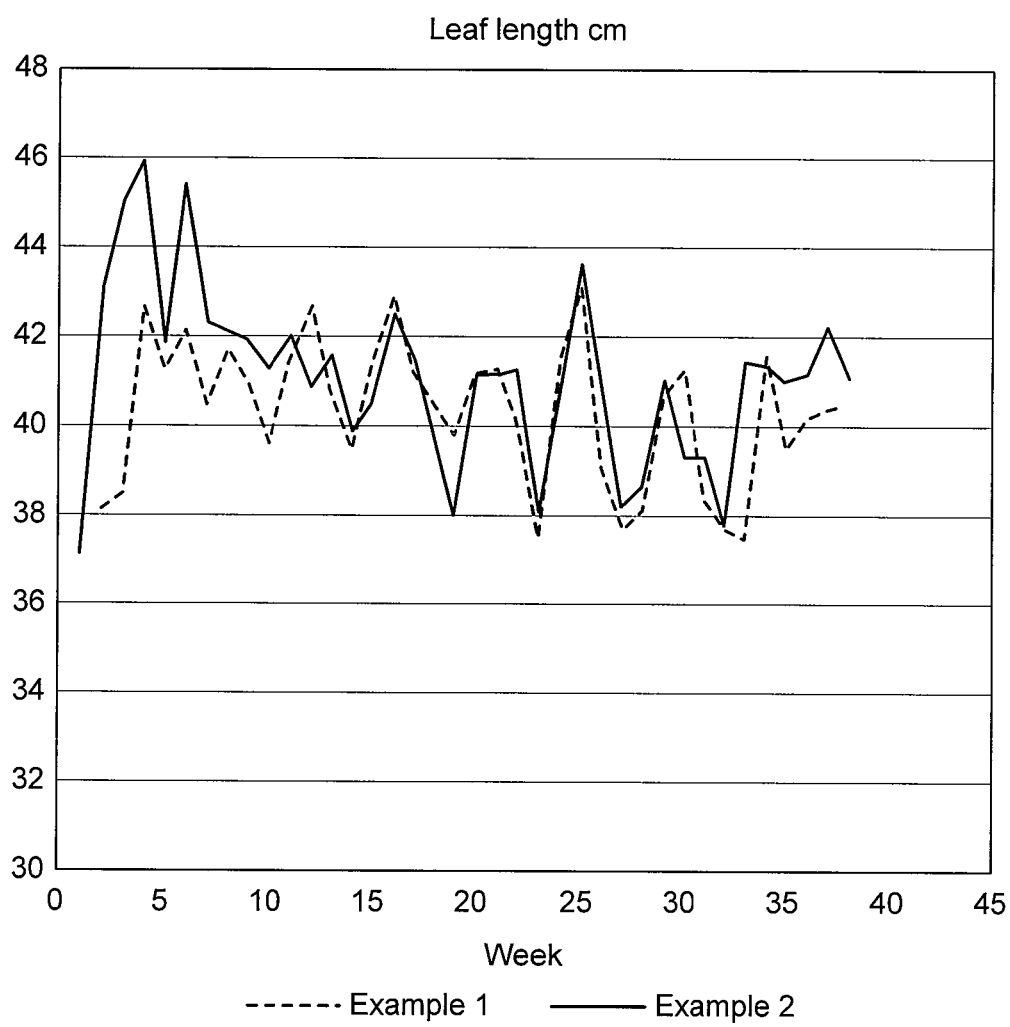
FIG. 10 illustrates the leaf length of plants during a long term study.

The link between EC level and effective plant growth is shown in FIG. 10 which shows the leaf length measured during the study for both the first example (dashed line) and second example (unbroken line). A clear drop in leaf length is observed at around 5 weeks in to the study. This drop is associated with the increased EC level shown during this period. It is thus understood that the EC level has an effect on the growth of the plant. Since the EC level has also been shown to be altered by changed in the water content level, it is desirable to control the water applied to the plant in such a way as to maintain the EC level within a desirable range. This contrasts with prior art approaches which may alter the concentration of nutrients to achieve a desired EC level but do not recognise that the overall quantity of water applied should be restrained by the desired nutrient content of the substrate.

Figure 11:
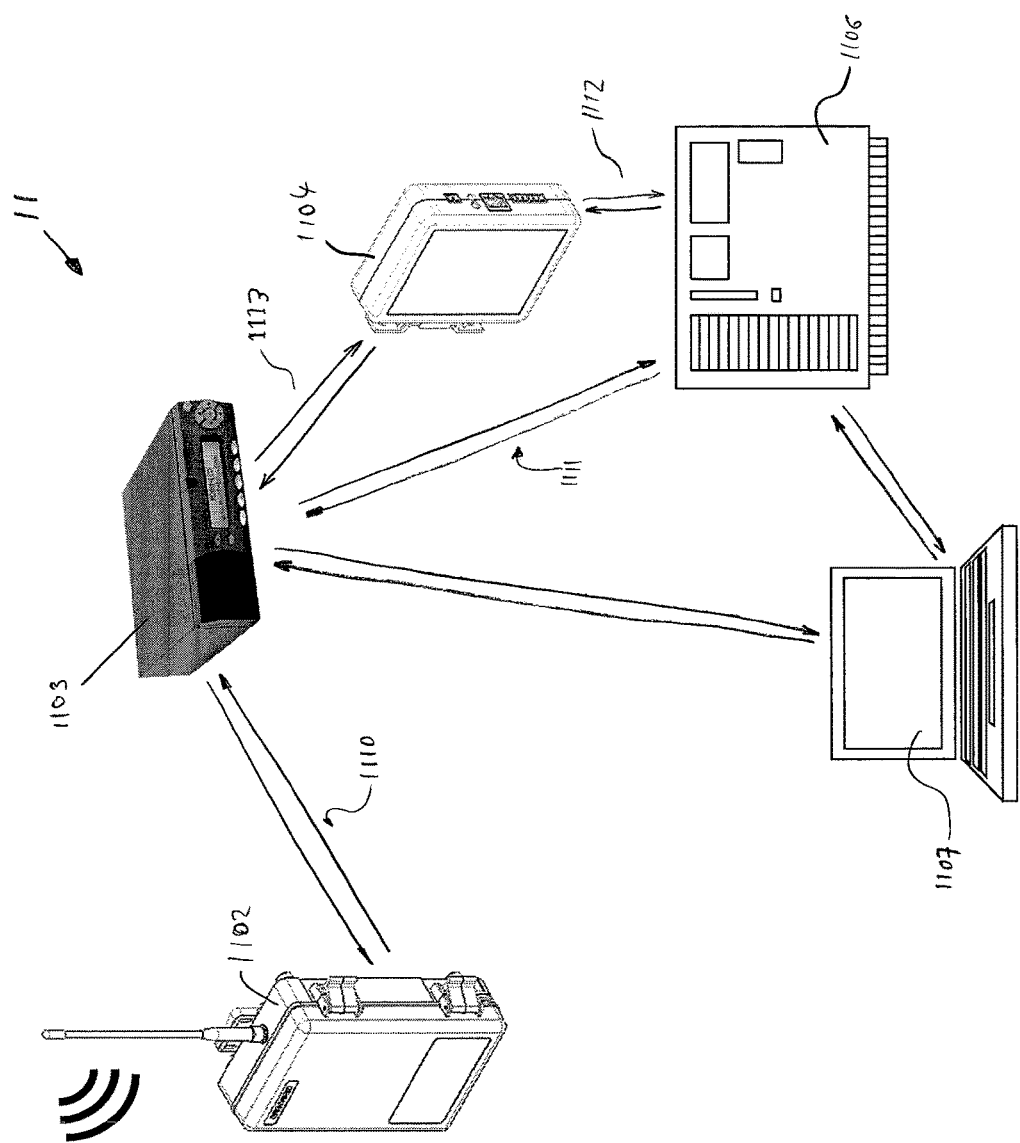
FIG. 11 illustrates a system comprising elements of the present invention.
Figure 11:
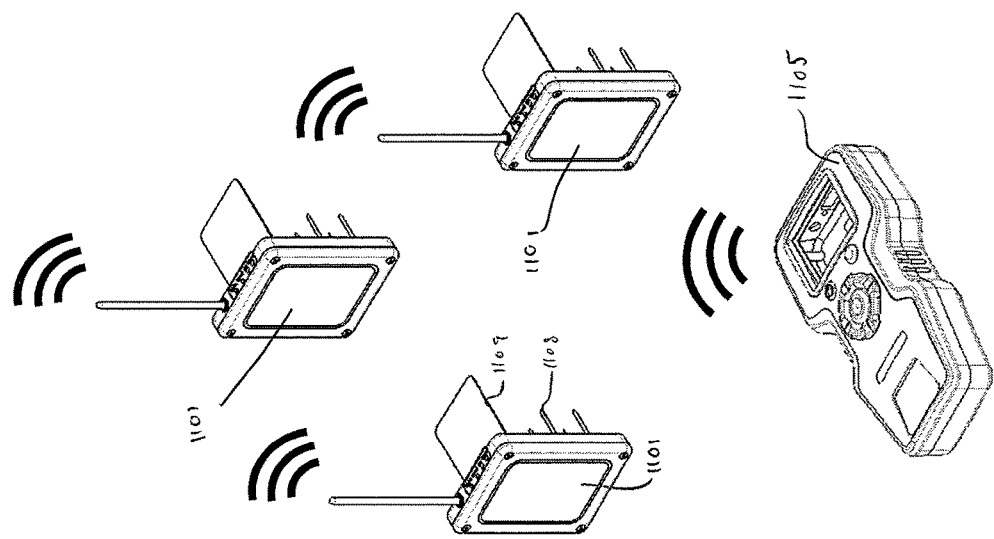

FIG. 11 shows a system according to an embodiment of the present invention. The system 11 comprises a plurality of detectors 1101 (also referred to as sensors), a receiver 1102, a central detector data processing device 1103 (referred to in certain embodiments as a smartbox), a signal convertor 1104 (a 'convertor') and a portable detector communication device 1105, otherwise referred to as a 'handheld' device. The system can also be connected to a climate computer 1106. A user terminal such as a laptop, desktop computer, mobile communication device or other electronic interface may be connected to the system via a physical or wireless network as in 1107. A system of the present invention may comprise some or all of the above elements and their description in relation to this embodiment does not imply that any or all are essential elements, since the invention can be implemented with a sub-set of the described components and/or features.

Each of the detectors or sensors 1101 of the system is configured to be capable of measuring at least one property indicative of a temperature, a water content, pH level and a nutrient content of a plant growth substrate, when the detector is placed on or in contact with, or at least partially inserted into, the plant growth substrate. Detectors can, in certain systems take a direct measurement and make a calculation of temperature, water content, pH level or nutrient content of the substrate. However, it has been found to be preferable in the system of the present invention that the detector takes a reading of a related property indicative of the temperature, water content, nutrient content or pH levels of the substrate and transmits that property directly to a remote processor, such as a smartbox of a preferred embodiment, such that conversion of a recorded and transmitted parameter can be controlled, managed and carried out centrally, and remotely from the detector or sensor 1101. Examples of properties indicative of the above properties can include: capacitance being indicative of water content or electrical conductivity being indicative of nutrient content. Properties indicative of global nutrient levels, or of individual nutrient levels, may be derived from electrical conductivity values. Air content in the slab can also be measured indirectly, since it is related to the slab volume, which may be known, its fibre density, water content and nutrient content. The air content can therefore be calculated once these properties have been measured. For example, if a slab has a volume of 11 litres, in some examples, 2% is fibres, and 98% is pores. If the water content is 60%, a pore volume−water volume is 98%−60%=38% air content. 38% of 11 litres=4.18 litres air. Temperature may be measured directly and transmitted directly, needing minimal or no conversion after transmission from the detector or sensor.

Transmission of indicative properties and calculation of the actual values in the smartbox or central detector data processing device, or in the handheld device of the system of the invention can help to keep the performance requirements and related costs of the electronics in the detector or sensor 1101 lower than if calculations are carried out in the detector or sensor itself. Further, this can allow central management of any calibration factors for correction and conversion which may be necessary and further allows improved accuracy of the measurements and conversion process of the system as a whole. This can also help to reduce a burden on a power source of the detectors 1101, to save battery life of the detectors where they are battery powered, since less processing is necessary in the detectors, because processing can be carried out in a central control device, which may have a more substantial or longerlasting power source, such as a mains connection, solar, or wind powered source or a more substantial battery, for example. These factors can also help in reducing weight of the detectors 1101. This allows the detectors 1101 to be located on or in a plant growth substrate without needing significant mounting devices or retention means to hold the detector in place.

Data of the preferred embodiment sensors or detectors is broadcast at intervals, preferably every 5 minutes on a certain frequency using, RFID-UHF bands which are known means for electronic communication. Useful time intervals can vary between, for example, 20 seconds and 10 minutes, depending upon the frequency of updates required and user requirements.

In certain embodiments, the detector may comprise a plurality of elongate probes 1108, which are configured to be inserted into the plant growth substrate to measure its properties. The detector may further comprise a guide element or plate 1109, which is arranged to maintain the elongate probe 1108 at a set distance from a surface of the plant growth substrate, which may be a substantially upper surface. The use of limited electronics, a light-weight power supply and a simple mounting mechanism allows the detector or detectors to be easily transportable and therefore easily deployed to multiple locations in a plant growth area such as a green house or irrigation area with minimal effort and minimal re-mounting steps to be carried out.

The detectors or sensors 1101 may be arranged to communicate over a communications link with a central detector data processing device 1103, known in the preferred embodiment as a smartbox, or with the handheld device describe in relation to the system. The communications link may be by direct wired connections. However, it has been found preferable to use a wireless connection, since this allows easy relocation of the detectors and minimal installation effort. The wireless communication may be direct with central detector data processing device 1103, where the central detector data processing device has wireless communications capabilities. However, it may be preferable to provide a separate wireless receiver 1102 to receive wireless communications from, and optionally send wireless communications to, the detectors 1101. The receiver 1102 may be connected via a physical link such as Ethernet, cabled connection, or via a wireless link 1110 to the central detector data processing device 1103. Both the receiver and the smartbox can be provided with a battery pack to provide power. This may be built in to the smartbox central detector data processing device 1103.

The wireless communications may be provided by known technologies as are used commonly in electronic communications, such as RFID-UFH bands in the range of 800 to 1000 MHz. However, alternative wireless communication means may be used, such as IEEE 802.11, for example. The physical connections between various devices in the system may be through Ethernet connections over copper wire, fibre optic and any other suitable communications means as are generally known in electronic and computer related communications, including mobile data communications networks if necessary.

The central detector data processing, smartbox, device 1103 contains at least one processor and at least one memory. The memory may store, either in a database or as separate data files, or in any suitable data storage means, one or more data files relating to one or more irrigation strategies or cycles. The data set may provide relationships between measured parameters provided by the detectors and desired irrigation outputs. Irrigation outputs may relate to a desired irrigation cycle, a simple on/off indication for irrigation equipment or may contain further details such as a flow rate of irrigation, an irrigation cycle defining lengths of on and off periods for an irrigation cycle and a length of time over which the irrigation cycle should be applied. A preferred embodiment holds 2 databases, and may contain more, for example 3 or 4 databases. A first database holds raw recorded parameters, while a second database holds translated or converted parameters after conversion, for properties such as water content, electrical conductivity and temperature. One or more, preferably two models are also held in a memory of the device 1103. A first model may be known as a substrate model and contains instructions for converting raw detector or sensor output data to real values for water content, electrical conductivity and temperature. A further model held in the device 1103 may be referred to as an irrigation model, and contains instructions for calculating new values, such as calculating the decrease in water content between 2 irrigation cycles, or arranging data for analysis, presentation or comparison so that further irrigation cycles for the substrate can be output. The models can also be combined in a single database. Other outputs from the central detector data processing device may include aggregated data collected from the detectors over time and/or displayed in relation to differing locations of the or each detector.

The processor of the data processing device 1103 may therefore be configured to receive detector output data relating to parameters measured by the detectors, to process the detector output data to determine one or more of a temperature, water content, pH levels and nutrient content of the growth substrate and to output aggregated detector data, a desired irrigation strategy or an irrigation instruction.

The processing device 1103 may also be connected to either or both of the climate computer 1106 and the user terminal 1107. The climate computer may be configured for monitoring and controlling various climate factors in the growing area, such as radiation, temperature, humidity and the like. The connection 1111 between the processing device 1103 and the climate computer 1106 may be a wireless, physical, or Ethernet or other computer network connection. However, in some cases, the central processing device 1103 and climate computer 1106 may be integrated in a single device and may merely represent separate logical computer programs running on a common hardware device. In this case, communication between the two elements may simply be via internal communication means in the hardware, such as a processor bus or memory in the hardware device or by passing functions and variables between logical computer processes running on the device. As such, central detector data processing means and a climate computer may be implemented as separate logical processes on a common computing device. The present system can therefore function alongside a climate computer so that the present system controls irrigation and/or fertigation, while the climate computer may, if necessary, control climate conditions such as heating, ventilation, and/or air conditioning.

In the alternative it is, in certain circumstances, necessary to communicate with a climate computer via analogue input and output connections. In this case, a digital to analogue convertor 1104 may be necessary, which may be connected to the central detector data processing device 1103 via a physical connection, or may be integrally formed in the data processing device, and may be configured to convert digital values output from the central detector data processing device into analogue electronic output signals, which are then communicated to the climate computer via an analogue interface 1112, after passing via a digital interface 1113.

A user terminal 1107 may be connected to, or logically integrated with as described above, one or both of the climate computer 1106 and the central data processing device 1103. The user terminal may comprise a screen and input means, in the form of a keyboard, touchscreen, audio input means or other human-machine interfaces as are well known for electronic devices. The user terminal can be used to configure the central detector data processing means, by uploading data files to the processing means, for defining relationships between detector inputs and irrigation control outputs and for applying general configuration settings to the processing means. Irrigation steering is often based on setpoints such as: set start time to start irrigating; stop time; dripping speed, cycle length and/or frequency; set interval times (rest time) before recommencing irrigating.

The system of the present invention allows one or a number of different sensor inputs from a range of areas in the growing area to be measured, converted and combined in a single system, which can output a desired irrigation or nutrient input control to start or stop irrigation or nutrient input and adapt irrigation or nutrient input cycles and frequencies and the like.

The system may further include a portable detector communication device 1105, also known as a handheld device, since it may advantageously be configured to be portable in a single hand of a user, to allow easy transportation of the device and another item, such one or more detectors 1101, in a second hand of the user. Detectors 1101 may often be located at remote or disparate locations around a greenhouse or irrigation area, which can on occasion cover several hectares. It is therefore often necessary for a user to travel significant distances to reach the detector to either check its configurations or installation or to move it to a new location. It is therefore advantageous to have a light and portable hand held device to assist with checking the installation, calibration, configuration and general status of detectors in the system. This avoids the need for multiple return trips from detectors back to the user terminal or central processing device to change aspects of the installation and then check the configuration or outputs. The hand held portable device is therefore provided with its own power supply, such that it can be carried independently. It also includes an integral display, such that outputs or status information from any of detectors 1101 can be displayed on the device. The device may be durable and its body made from an impact resistant material to prevent damage when it is being used in agricultural or horticultural environments. The device is generally configured so that it is easily portable by a user who may need to travel long distances on foot to reach detectors in the system. However, the hand held device does need to include certain aspects of functionality to facilitate installation, checking and set up of the detectors and the system as a whole.

The central data processing means needs to be aware of a number of factors for each detector, the handheld device may be used to read, input or communicate any or all of these to the central detector data processing (smartbox) device. These include: details of its current location, a date and or time at which the detector was placed in its current location, any settings of the detector regarding what properties it is set to monitor and transmit, a power status of a power source of the detector, connection status of the detector to the central processing device, checking of sensor reading output, of an access point to which the sensor or detector is allocated for system communications, review of raw output data, or properties of a substrate to which the detector or sensor is applied, such as material, type and dimensions, and any other relevant sensor data.

Accordingly the hand held device will include the following functions. It will be able to either determine its own location or receive user input relating to a location of the device and/or a related detector. It will be able to receive at least an identifier of a detector with which it is communicating, either by user input, by direct communication with the detector 1101. This may include optically reading a bar-code, alpha-numerical identifier, QR-code or other optical or visual identifier or reading an RFID or near field communications (NFC) identifier. Preferred embodiments use RFID-UFH bands selected accordingly in a frequency range typically from 800 to 1000 Mhz. The identifier may include a serial number and/or a product code of the detector or sensor. The handheld device may be configured to relate its location data to a particular detector and to transmit the location data and detector identifier to the central data processing device, so that the central data processing device can store a record of a location of each detector, which can be associated by the central data processing means with the parameters which the detector outputs over time. The hand held device 1105 may also be capable of placing the detector in a testing mode.

In preferred embodiments, many aspects of functionality will be common between the smartbox central detector data processing device and the handheld device. These include: displaying available or connected nodes (sensors or detectors) to a user and data relating to the detectors or sensors, selecting nodes (sensors or detectors) and testing for output, communications functionality etc.; verifying accurate sensor readings; setting a node location; verifying connection of the sensor with the central data processing means; addressing nodes to the right access point/central detector data processor; calculating water content (WC), electrical conductivity (EC) and temperature values.

The handheld device of a preferred embodiment may also have additional features such as: recording measurements in blocks of multiple, measurements; basic statistical analyses of results can be done, for example, per block the average values and standard deviation can be calculated; a text based help function may be included and variable languages can be set; power status readouts can also be made.

The hand held device may also be configured to communicate with a detector to change a mode of the detector from periodic output to continuous output. Periodic outputs may be used to preserve battery life of the detector, while continuous output may be used for full finding or status checking of the detector.

The preferred hand held device is also configured to communicate data relating to the detectors to the central data processing means 1103.

The invention therefore provides a hand held electronic device, comprising a communications interface for communicating with the detectors. The device may further be configured to communicate with a detector to determine an identifier of the detector, to combine the detector identifier with location information and to forward the information to a central detector data processing means. Location information may be input to the handheld device 1105 by a user, or may alternatively or additionally be determined by the device itself using GPS hardware, or other location determining means. The location determining means may include means arranged to optically read a bar-code, alpha-numerical identifier, QR-code or other optical or visual identifier, a RFID or a near-field communications (NFC) device located at the device's location, and indicating information concerning the location. Location information may comprise map coordinates or GPS coordinates or column and row information relating to the location of substrates in the growing area. Location information may further include Greenhouse number or code, irrigation section code, hood code, row number and slab number. In a preferred embodiment location information includes as a minimum an irrigation section code and row number among others. The device may be further configured to take measurements of the output of the detector, to display these to a user and to optionally forward them to the central data processor over a further communications link. The device may be configured to, in response to user input, place the detector in a set-up mode or a testing mode and to transmit results of the status change or of results of a test to the central detector data processing means over a further communications link. The communications link may be physical or wireless, however, the use of wireless communications reduces installation and set-up times and can reduce material costs where long distances are involved.

The hand held device may be a standard piece of electronic communications equipment such as a PDA or mobile telephone and therefore the invention may be embodied in a computer program product containing instructions which, when carried out by a processor of an electronic communications device comprising remote communication means, configure the device for establishing a communications link with the detector, to interrogating the detector to determine a detector identifier, to associate the identifier with configuration information of the detector and to transmit the configuration information to a central detector data processing means. The configuration information may comprise location data, detector configuration data, detector status data, such as power source information, time in use, in addition to the functions and parameters discussed above in relation to the handheld device.

Variations and modifications to the embodiments described above will be apparent to the skilled person. Such variations and modifications may involve equivalent and other features which are already known and which may be used instead of, or in addition to, features described herein. Features that are described in the context of separate embodiments may be provided in combination in a single embodiment. Conversely, features which are described in the context of a single embodiment may also be provided separately or in any suitable sub-combination.

It should be noted that the term "comprising" does not exclude other elements or steps, the term "a" or "an" does not exclude a plurality, a single feature may fulfil the functions of several features recited in the claims and reference signs in the claims shall not be construed as limiting the scope of the claims. It should also be noted that the Figures are not necessarily to scale; emphasis instead generally being placed upon illustrating the principles of the present invention.

The invention claimed is:

1. A system for controlling plant growth conditions in hydroponic growing systems, the system for controlling plant growth conditions comprising:
   at least one wireless detector;
   central detector data processing means; and
   an irrigation device;
   the or each detector being arranged to measure a property or properties indicative of a temperature, a water content, and a nutrient content, of a hydroponic plant growth substrate;
   the or each detector being further arranged to transmit a detector identifier and the measured property or properties over a communications link to the central detector data processing means;
   the central detector data processing means being arranged to:
   hold in a memory predefined irrigation data defining a relationship between:
   plural values for one or more of temperature, pH level, water content and/or nutrient content of the substrate; and plural desired irrigation output values;
   process the measured properties received from each detector to determine calculated properties of the substrate; and
   provide an output indicative of a desired irrigation input for the growth substrate in dependence on nutrient content of the substrate, the desired irrigation input, being in the form of an irrigation cycle defining lengths of on and off periods of irrigation for an irrigation cycle and a length of time over which the irrigation cycle should be applied, based upon calculated properties received from the detector or detectors and the predefined irrigation data, the output indicative of a desired irrigation input for the growth substrate being provided to control the level quantity of water provided to the growth substrate in dependence on nutrient content of the substrate; and
   the irrigation device is arranged to provide water and nutrients directly to a top of the growth substrate based on the output indicative of the desired irrigation input for the growth substrate and the at least wireless detector is disposed on a side of the growth substrate.

2. A system according to claim 1, the system further comprising a portable detector communication device configured to:
   process measured properties received from a detector of the system, to determine calculated properties of the substrate; and
   display the calculated properties to a user.

3. A system according to claim 2, wherein the portable detector communication device is further arranged to:
   receive detector data from a detector of the system; and
   transmit detector data to the central detector data processing means.

4. A system according to claim 1, wherein:
   the central detector data processing means is further arranged to:
   process the measured properties received from each detector to determine a nutrient content of a substrate associated with each detector; and
   provide an output indicative of a desired irrigation input for the growth substrate, based upon the calculated nutrient content of the substrate.

5. A system according to claim 2, wherein the portable detector communication device is further configured to:
   receive a detector identifier from a detector of the system;
   receive detector data relating to the detector; and
   transmit the detector identifier and the detector data to the central detector data processing means.

6. A system according to claim 2, wherein the portable detector communication device is further configured to:
   receive, by user input, user defined detector data;
   associate the user defined detector data with the detector identifier; and
   transmit the detector identifier and the user defined detector data to the central detector data processing means.

7. A system according to claim 5, wherein the data associated with the detector identifier includes any or all of:
   location data of the detector;
   a power status of the detector;
   a status of a communication link between the detector and the central detector data processing means;
   information indicating a type and/or size of the growth substrate measured by the detector; and/or
   a property or properties of the growth substrate measured by the detector.

8. A system according to claim 2, wherein the portable detector communication device is further configured to:
   receive measured properties from the detector;
   associate the measured properties with the detector identifier of the detector; and
   transmit the detector identifier and associated measured properties to the central detector data processing means of the system.

9. A system according to claim 2, the portable detector communication device further comprising location determining means, for determining location data of the device or a detector, and being further configured to:
   associate the identifier of the detector with determined location data; and
   transmit the detector identifier and associated location data to the central detector data processing means of the system.

10. A system according to claim 1, wherein the or each detector is further arranged to measure a property or properties indicative of a pH level of the plant growth substrate.

11. A system according to claim 1, wherein a property indicative of nutrient content is an electrical conductivity of fluid in a plant growth substrate.

12. A method of controlling plant growth conditions, the method comprising the steps of:
   providing a system according to claim 1; and
   controlling an irrigation input to a plant growth substrate based upon the output indicative of a desired irrigation input for the growth substrate provided by the central detector data processing means of the system.

13. A central detector data processing means for the system of claim 1, the central detector data processing means being arranged to:
   receive a measured property or properties from the detector or detectors over a communications link;
   store predefined irrigation data, defining a relationship between:

plural values for temperature, water content, pH level and/or nutrient content of the plant growth substrate; and plural desired irrigation output values;

process the measured properties from each detector to determine calculated properties of the substrate; and provide an output indicative of a desired irrigation input for the growth substrate in dependence on nutrient content of the substrate, the desired irrigation input being in the form of an irrigation cycle defining lengths of on and off periods of irrigation for an irrigation cycle and a length of time over which the irrigation cycle should be applied, based upon measured properties received from the detector or detectors and the predefined irrigation data, the output indicative of a desired irrigation input for the growth substrate being provided to control the quantity of water provided to the growth substrate in dependence on nutrient content of the substrate.

14. A central detector data processing means according to claim 13, further arranged to receive detector configuration information associated with one or more detectors of the system from a portable detector communications device and to store the configuration information in a data storage means.

15. A system for controlling plant growth conditions in hydroponic growing systems, the system for controlling plant growth conditions comprising:

at least one wireless detector;

central detector data processing means; and an irrigation device;

the or each detector being arranged to measure a property or properties indicative of a temperature, a water content, and a nutrient content, of a hydroponic plant growth substrate;

the or each detector being further arranged to transmit a detector identifier and the measured property or properties over a communications link to the central detector data processing means;

the central detector data processing means being arranged to: hold in a memory predefined irrigation data defining a relationship between:

plural values for one or more of temperature, pH level, water content and/or nutrient content of the substrate; and plural desired irrigation output values; process the measured properties received from each detector to determine calculated properties of the substrate; and provide an output indicative of a desired irrigation input for the growth substrate in the form of an irrigation cycle defining lengths of on and off periods of irrigation for an irrigation cycle and a length of time over which the irrigation cycle should be applied, based upon calculated properties received from the detector or detectors and the predefined irrigation data and based on maintaining an electrical conductivity of the substrate within a predetermined range to control nutrient content, the output indicative of a desired irrigation input for the growth substrate being provided to control the level quantity of water provided to the growth substrate in dependence on nutrient content of the substrate; and the irrigation device is arranged to provide water and nutrients directly to a top of the growth substrate based on the output indicative of the desired irrigation input for the growth substrate, and the at least one wireless detector is disposed on a side of the growth substrate.

16. A system for controlling plant growth conditions in hydroponic growing systems, the system for controlling plant growth conditions comprising:

at least one wireless detector;

central detector data processing means; and an irrigation device;

the or each detector being arranged to measure a property or properties indicative of a temperature, a water content, and a nutrient content, of a hydroponic plant growth substrate;

the or each detector being, further arranged to transmit a detector identifier and the measured property or properties over a communications link to the central detector data processing means;

the central detector data processing means being arranged to: hold in a memory predefined irrigation data defining a relationship between:

plural values for one or more of temperature, pH water content and/or nutrient content of the substrate; and plural desired irrigation output values; process the measured properties received from each detector to determine calculated properties of the substrate; and provide an output indicative of a desired irrigation input for the growth substrate in the form of an irrigation cycle defining lengths of on and off periods of irrigation for an irrigation cycle and a length of time over which the irrigation cycle should be applied, based upon calculated properties received from the detector or detectors and the predefined irrigation data to control start and stop of supply of water and nutrients to the growth substrate and adapt supply and frequency of supply of water and nutrient, the output indicative of a desired irrigation input for the growth substrate being provided to control the level quantity of water provided to the growth substrate in dependence on nutrient content of the substrate; and the irrigation device is arranged to provide water and nutrients directly to a top of the growth substrate based on the output indicative of the desired irrigation input for the growth substrate, and the at least one wireless detector is disposed on a side of the growth substrate.

* * * * *